(12) United States Patent
Nelakuditi et al.

(10) Patent No.: US 12,515,569 B2
(45) Date of Patent: Jan. 6, 2026

(54) POWER ARM REST FOR VEHICLE

(71) Applicant: GM Global Technology Operations LLC, Detroit, MI (US)

(72) Inventors: Srujan Nelakuditi, Riley, MI (US); George W. Wade, III, Bloomfield Hills, MI (US); Rami Z. Sayed, Farmington Hills, MI (US); Kamilo Susman, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 178 days.

(21) Appl. No.: 18/469,173

(22) Filed: Sep. 18, 2023

(65) Prior Publication Data
US 2025/0091494 A1   Mar. 20, 2025

(51) Int. Cl.
   *B60N 2/75*   (2018.01)
(52) U.S. Cl.
   CPC .................................. *B60N 2/753* (2018.02)
(58) Field of Classification Search
   CPC ............................ B60N 2/767; B60N 2/02246; B60N 2/02253; B60N 2/0252
   See application file for complete search history.

(56) References Cited

U.S. PATENT DOCUMENTS

| | | | |
|---|---|---|---|
| 8,534,759 B2 * | 9/2013 | De La Garza ....... | B64D 11/064 |
| | | | 297/411.31 |
| 11,492,123 B2 * | 11/2022 | Jacob ..................... | B60N 2/34 |
| 11,975,670 B1 * | 5/2024 | Faruque ................ | B60R 21/207 |
| 2022/0371494 A1 * | 11/2022 | Mergl .................... | B60R 16/037 |
| 2023/0365028 A1 * | 11/2023 | Katsube ................. | B60N 2/22 |

FOREIGN PATENT DOCUMENTS

| | | | |
|---|---|---|---|
| CN | 118790120 A | * | 10/2024 |
| DE | 102014212881 A1 | | 1/2016 |
| DE | 102020201014 A1 | | 7/2021 |
| DE | 102021111843 A1 | | 11/2022 |
| KR | 20050022800 A | | 3/2005 |

OTHER PUBLICATIONS

CN-118790120—translation (Year: 2024).*

* cited by examiner

*Primary Examiner* — David R Dunn
(74) *Attorney, Agent, or Firm* — Honigman LLP; Matthew H. Szalach; Jonathan P. O'Brien

(57) ABSTRACT

An arm rest for a seat having a seatback and a seat bottom includes a housing rotatable relative to the seatback and a motor disposed within the housing and configured to maintain a position of the housing relative to the seat bottom during movement of the seatback relative to the seat bottom.

14 Claims, 5 Drawing Sheets

POWER ARM REST FOR VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates generally to an arm rest for a vehicle and, more particularly, to a powered arm rest synched for movement with a seatback of a vehicle seat.

Vehicle seats often include one or more arm rests extending from a seatback of the vehicle seat. The arm rests typically extend from the seatback in a direction toward a front of the vehicle seat to allow an occupant seated on a seat bottom of the vehicle seat to support their arms while seated.

Conventional arm rests may be pivotably attached to the seatback to allow the arm rests to be rotated between an extended position and a stowed position. In the extended position, the arm rests extend away from the seatback in a direction toward a front of the vehicle seat to allow an occupant seated on the seat bottom to comfortably engage the arm rests. When entering or exiting the vehicle seat, a force may be applied to the arm rests to rotate the arm rests from the extended position to the stowed position to provide clearance for entering or exiting the vehicle seat. Specifically, one or more of the arm rests can be rotated relative to the seatback such that a longitudinal axis of the arm rest(s) is substantially parallel with a longitudinal axis of the seatback. In so doing, the arm rest no longer extends away from the seatback and is essentially moved out of the way of an occupant entering or exiting the vehicle seat.

While the arm rests may be moved from the extended position into the stowed position when an occupant is entering or exiting the vehicle seat, the arm rests may also be moved into the stowed position when the seatback is folded onto the seat bottom and/or when the seatback and the seat bottom are rotated from a use or upright position into a stowed or folded position. Moving the arm rests into the stowed position prevents the arm rests from blocking rotation of the seatback into the folded position relative to the seat bottom.

While conventional arm rests adequately support an occupant's arms during use and, further, can be selectively moved between an extended position and a stowed position, an angle of the arm rests relative to the seatback is fixed when the arm rests are in the extended position. Accordingly, when the seatback is rotated relative to the seat bottom to adjust an angular position of the seatback relative to the seat bottom, the arm rests do not remain substantially parallel with a floor of the vehicle but, rather, are often at an upward or downward angle relative to the floor depending on the angle of the seatback relative to the seat bottom. As such, the arm rests may not be positioned at a desirable angle for the occupant seated on the vehicle seat.

SUMMARY

In one configuration, an arm rest for a seat having a seatback and a seat bottom is provided and includes a housing rotatable relative to the seatback and a motor disposed within the housing and configured to maintain a position of the housing relative to the seat bottom during movement of the seatback relative to the seat bottom.

The arm rest may include one or more of the following optional features. For example, a first sensor may be configured to detect a number of revolutions of the motor. In one configuration, the first sensor may be a Hall effect sensor.

A screw may extend from and be driven by the motor, the screw configured to rotate a lever in contact with the seatback to adjust a position of the housing relative to the seatback. The screw and the lever may be disposed within the housing. Additionally or alternatively, the lever may define a first stop and a second stop that cooperate to define a range-of-motion of the arm rest relative to the seatback.

A vehicle may incorporate the arm rest.

In another configuration, a seat is provided and includes a seat bottom, a seatback rotatably attached to the seat bottom, an arm rest rotatably attached to the seatback, and an actuator configured to move the arm rest relative to the seatback when the seatback is moved relative to the seat bottom to maintain a position of the arm rest relative to the seat bottom.

The seat may include one or more of the following optional features. For example, the actuator may be disposed within a housing of the arm rest and/or may include a motor. Additionally or alternatively, the actuator may include a screw extending from and driven by the motor, the screw configured to rotate a lever in contact with the seatback to adjust a position of the housing relative to the seatback.

In one configuration, a seatback position sensor may be configured to detect a position of the seatback relative to the seat bottom and an arm rest position sensor may be configured to detect a position of the arm rest relative to the seatback. At least one of the seatback position sensor and the arm rest position sensor may include a Hall effect sensor.

A vehicle may incorporate the seat.

In yet another configuration, a system for controlling a position of an arm rest relative to a seat having a seatback and a seat bottom is provided and includes a first motor configured to adjust a position of the arm rest relative to the seatback and a second motor configured to adjust an angular position of the seatback relative to the seat bottom, the seatback movable between a number of angular positions relative to the seat bottom by the second motor. The system additionally includes an arm rest control module configured to synchronize operation of the first motor with operation of the second motor to maintain a position of the arm rest relative to the seat bottom during and following movement of the seatback relative to the seat bottom between the number of angular positions.

The system may include one or more of the following optional features. For example, the first motor may be disposed within a housing of the arm rest. A first sensor may be configured to detect a position of the arm rest relative to the seatback and a second sensor may be configured to detect a position of the seatback relative to the seat bottom. The first sensor may monitor the first motor and the second sensor may monitor the second motor. At least one of the first sensor and the second sensor may be a Hall effect sensor.

A vehicle may incorporate the system.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
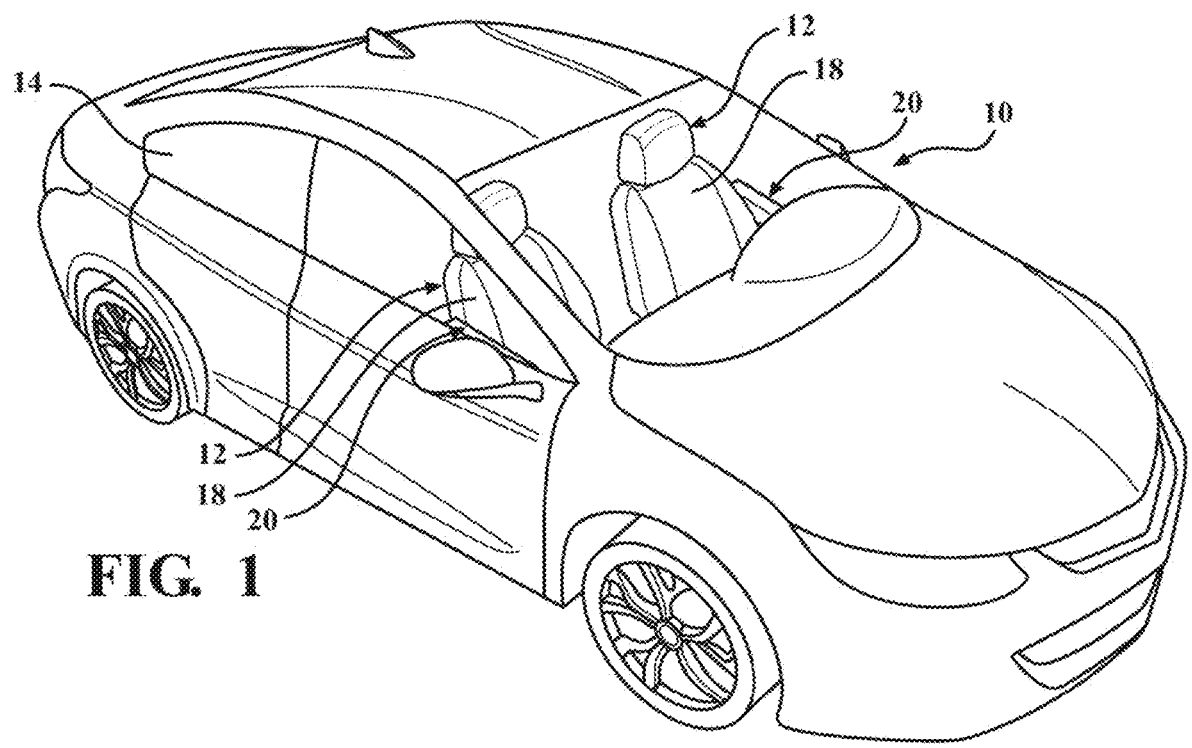
FIG. 1 is a perspective view of a vehicle in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
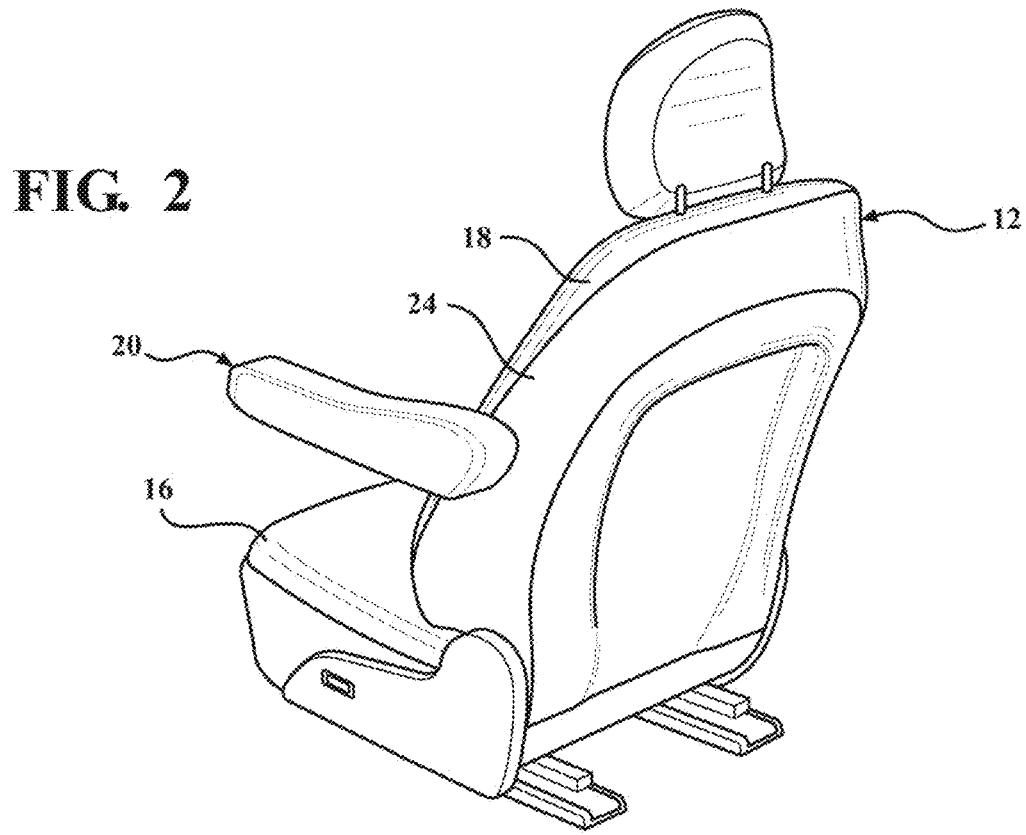
FIG. 2 is a rear perspective view of a vehicle seat for use with the vehicle of FIG. 1.

With reference to the figures, a vehicle 10 is provided and includes a plurality of seats 12 disposed in a cabin 14 of the vehicle 10. As shown in FIG. 2, the seats 12 include a seat bottom 16, a seatback 18 rotatably attached to the seat bottom 16, and an arm rest 20 pivotably attached to the seatback 18. As will be described, movement of the arm rest 20 is synchronized with movement of the seatback 18 such that regardless of the angular position of the seatback 18 relative to the seat bottom 16, the arm rest 20 is maintained substantially parallel to a floor pan 22 of the vehicle 10 (FIG. 3A) and/or to the seat bottom 16.

As shown in FIG. 2, the arm rest 20 is attached to the seatback 18 at a sidewall 24 of the seatback 18. The arm rest 20 is pivotably attached to the sidewall 24 to allow the arm rest 20 to be selectively rotated relative to the seatback 18 between an extended position (FIGS. 2, 3A, 4A) and a stowed position (FIG. 5A). Further, a position of the arm rest 20 relative to the seatback 18 may be adjusted when an angular position of the seatback 18 relative to the seat bottom 14 is adjusted in an effort to maintain the arm rest 20 substantially parallel to the floor pan 22 of the vehicle 10 and/or to the seat bottom 16. Specifically, when the seatback 18 is moved from an upright position (FIG. 3A) to a reclined position (FIG. 4A) by rotating the seatback 18 in a clockwise (CW) direction relative to the view shown in FIG. 4A, the arm rest 20 is automatically rotated in the counterclockwise (CCW) direction relative to the view shown in FIG. 4A in an effort to maintain a longitudinal axis $L_{AR}$ of the arm rest 20 substantially parallel to the floor pan 22 and/or seat bottom 16.

The arm rest 20 includes a housing 26, a linear actuator assembly 28, and a lever 30. The linear actuator assembly 28 and the lever 30 are supported by and within the housing 26 and, as such, move with the housing 26 when the housing 26 is moved or rotated relative to the seatback 18. The housing 26 may be formed by a rigid or semi-rigid material such as, for example, steel and/or plastic and may include an outer foam layer covered by fabric upholstery and/or leather that defines an outer surface 32 of the arm rest 20.

The actuator assembly 28 includes a motor 34, a threaded screw or rod 36 extending from a housing 38 of the motor 34, and an arm rest position sensor 40 configured to detect a position of the screw 36 relative to the housing 38. In one configuration, the motor 34 is an electric motor and is configured to rotate the screw 36 in either a clockwise (CW) direction or a counterclockwise (CCW) direction to either extend or retract the screw 36. For example, in one configuration, rotating the screw 36 in the CCW direction may cause the screw 36 to extend further from the housing 38 while rotating the screw 36 in the CW direction causes the screw 36 to be retracted into the housing 38. The degree to which the screw 36 extends from the housing 38 is directly controlled by how much the motor 34 rotates the screw 36 and in what direction (i.e., CW versus CCW). For example, and with reference to FIGS. 3B and 4B, the screw 36 shown in FIG. 3B extends from the housing 38 to a greater extent than in FIG. 4B due to the motor 34 rotating the screw 36 in the CCW direction.

The screw 36 includes a first end 42 received within the housing 38 of the motor 34, a second end 44 rotatably attached to the lever 30, and a series of threads 46 disposed between the first end 42 and the second end 44. The threads 46 are driven by a threaded spindle (not shown) that is in threaded engagement with the threads 46 of the screw 36. Specifically, the threaded spindle is driven or rotated by the motor 34 and causes rotation of the screw 36 relative to the housing 38 due to engagement between threads (not shown) of the threaded spindle and the threads 46 of the screw 36. As described previously, the screw 36 will be extended from or retracted into the housing 38 depending on the direction of rotation of the screw 36. The direction of rotation is governed by the direction in which the motor 34 rotates the threaded spindle.

The arm rest position sensor 40 may count the number of rotations of the threaded spindle, the screw 36, and/or revolutions of a rotor (not shown) of the motor 34 to determine the position of the screw 36 relative to the housing 38. For example, and in one configuration, the arm rest position sensor 40 includes a Hall effect sensor that detects the number of revolutions of the threaded spindle, the screw 36, and/or the rotor to determine the position of the screw 36 relative to the housing 38. While the arm rest position sensor 40 is described as including a Hall effect sensor, the arm rest position sensor 40 could be any sensor capable of determining the number of revolutions of one or more of the foregoing components such as, for example, an optical sensor. The sensor 40 is referred to as an arm rest position sensor 40, as the position of the screw 36 relative to the housing 38 determines the position of the arm rest 20 relative to the seatback 18, as will be described in greater detail below.

Figure 3A:
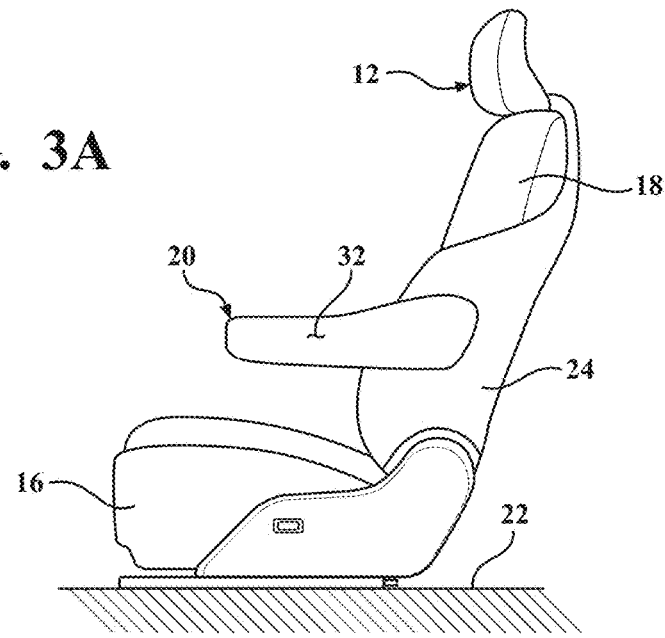
FIG. 3A is a side view of the vehicle seat of FIG. 2 with an arm rest in accordance with the principles of the present disclosure in an extended position.
Figure 3B:
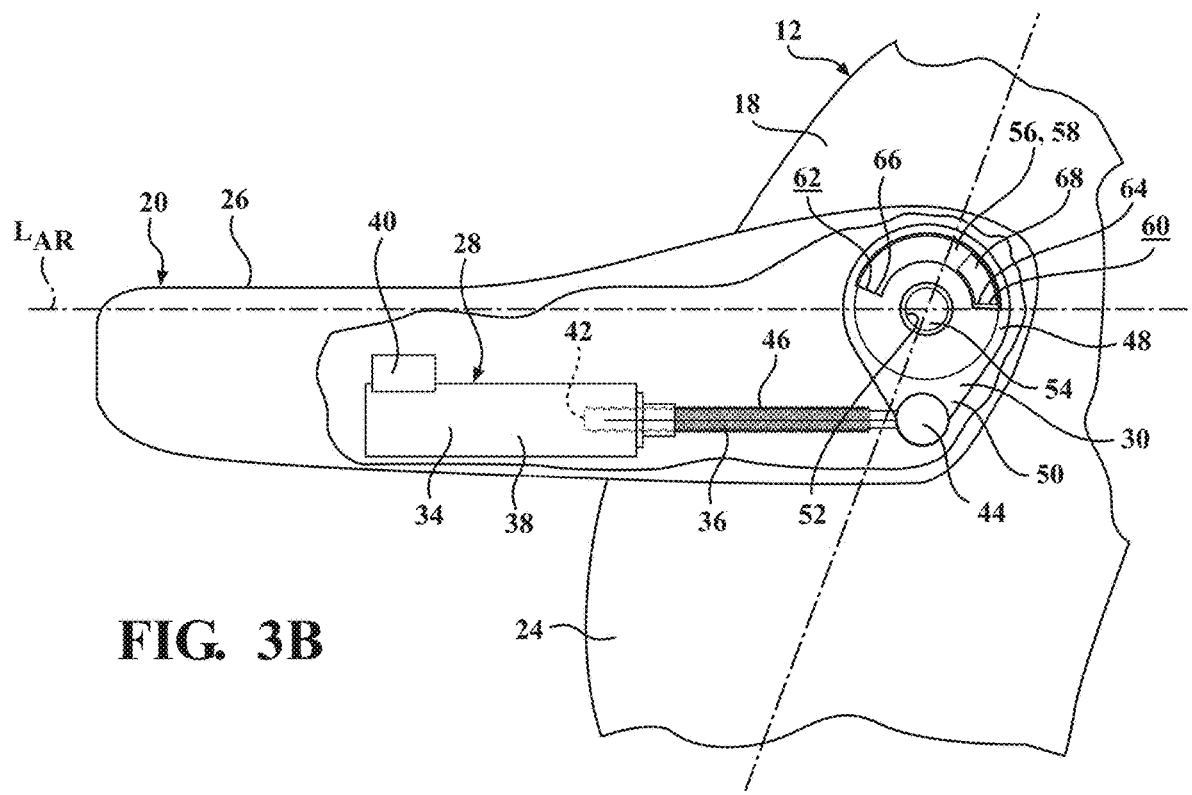
FIG. 3B is an enlarged view of the arm rest of FIG. 3A with part of a housing removed to show internal components of the arm rest in an extended position.

The second end of the screw 36 is rotatably attached to the lever 30 to allow the screw 36 to rotate the lever in either a clockwise (CW) direction relative to the view shown in FIG. 3B or a counterclockwise (CCW) direction relative to the view shown in FIG. 3B when the screw 36 is extended from or retracted into the housing 38. The lever 30 may be a bell crank and includes a main body 48 and a projection 50 extending from the main body 48. The main body 48 includes an aperture 52 that is rotatably attached to a spindle 54 of the seatback 18 to permit the lever 30 to rotate relative to the seatback 18 about the spindle 54. The main body 48 further includes a recess 56 defining an arcuate path 58. The arcuate path 58 extends between a first end surface 60 and a second end surface 62 that respectively define a first stop 64 and a second stop 66. While the main body 48 is described as including a recess 56 defining the arcuate path 58, the recess 56 could be replaced with a slot (not shown) formed through a thickness of the main body 48, whereby ends of the slot respectively define the first stop 64 and the second stop 66.

In one configuration, the recess 56 is formed by bending a material of the main body 48 into the shape of the arcuate path 58. In so doing, the first stop 64 and the second stop 66 are formed at opposite ends of the arcuate path 58 and are created where portions of the main body 48 are bent into the shape shown in FIGS. 3B, 4B, and 5B. The recess 56 receives a shaft 68 that is fixed for movement with the seatback 18. Accordingly, when the arm rest 20 is rotated relative to the seatback 18, the shaft 68 traverses the recess 56 between the first stop 64 and the second stop 66, which cooperate to define a range-of-motion of the arm rest 20 relative to the seatback 18, as will be described in greater detail below.

In operation, the seatback 18 may initially be in a substantially upright position, as shown in FIG. 3A. In this position, the arm rest 20 is positioned such that the longitudinal axis $L_{AR}$ of the arm rest 20 is substantially parallel to the floor pan 22 of the vehicle 10. When in this position, the arm rest 20 is prevented from rotating further in the counterclockwise (CCW) direction relative to the view shown in FIG. 3B relative to the seatback 18 due to engagement between the shaft 68 of the seatback 18 and the first stop 64 of the lever 30.

Figure 4A:
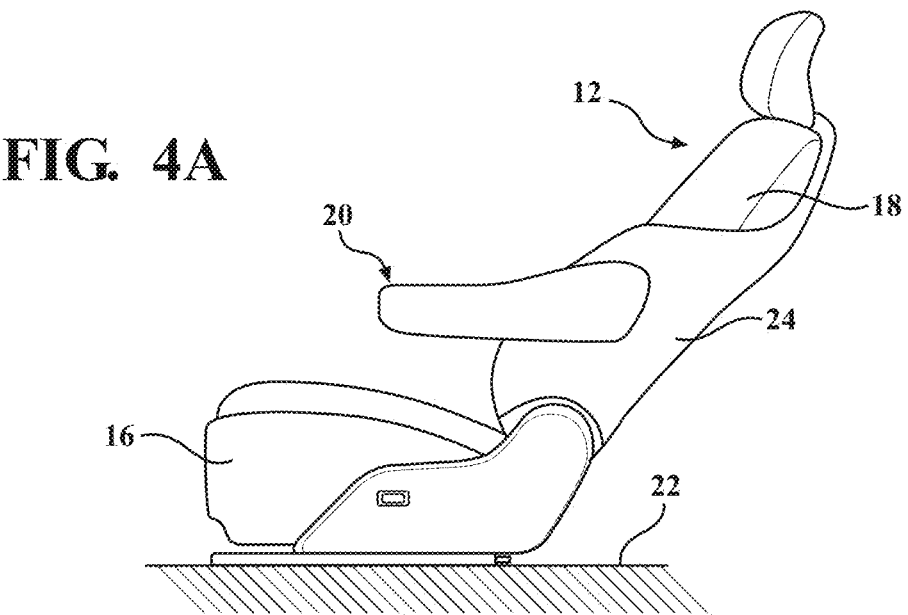
FIG. 4A is a side view of the vehicle seat of FIG. 2 in a reclined position.
Figure 5A:
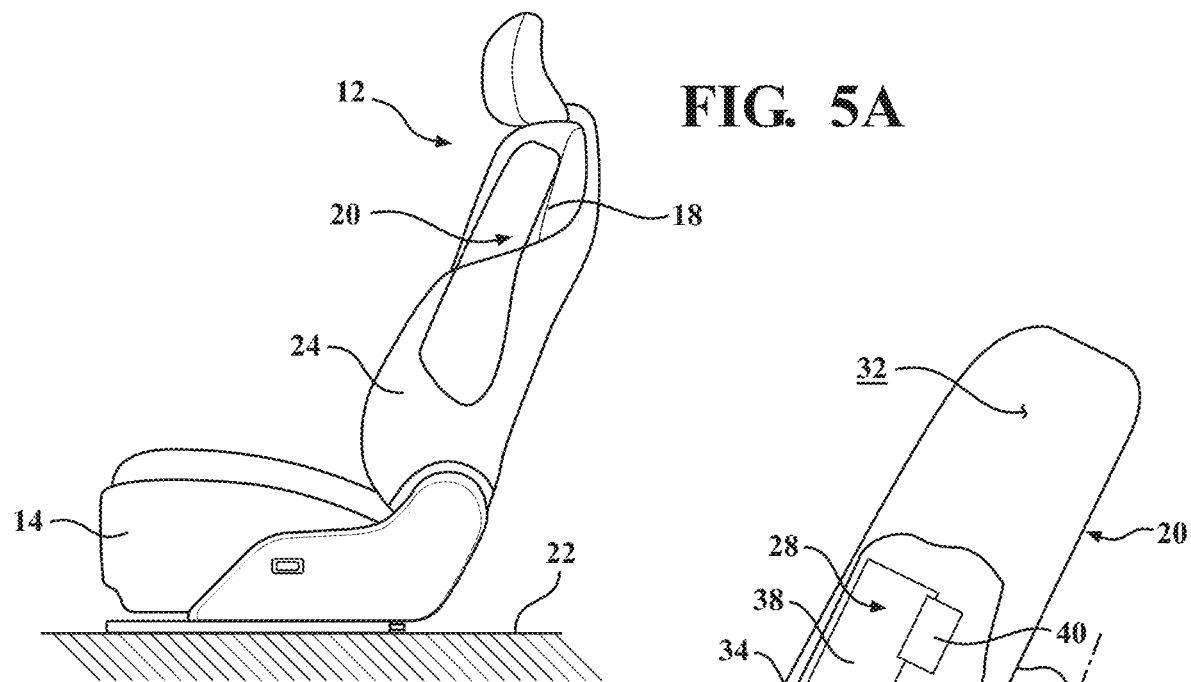
FIG. 5A is a side view of the vehicle seat of FIG. 2 with the arm rest of FIG. 3A in a stowed position.

When the seatback 18 is rotated or reclined relative to the seat bottom 16, the seatback 18 is moved into the position shown in FIG. 4A. As shown, the arm rest 20 is maintained in a position that is substantially parallel to the floor pan 22 of the vehicle 10 and/or the seat bottom 16 due to cooperation between the linear actuation assembly 28 and the lever 30. Specifically, when the seatback 18 is rotated relative to the seat bottom 16, a seatback position sensor 70 (FIG. 6) may detect the amount the seatback 18 is rotated and in what direction relative to the seat bottom 16. Namely, the seatback 18 may be powered by a seatback motor (not shown) and, thus, when energized, can cause the seatback 18 to be moved relative to the seat bottom 16. As with the arm rest position sensor 40 associated with the linear actuator assembly 28, the seatback position sensor 70 may include a Hall effect sensor that determines the degree to which the seatback 18 is rotated relative to the seat bottom 16 by monitoring the seatback motor. While the seatback position sensor 70 may include a Hall effect sensor, the seatback position sensor 70 could include any sensor configured to detect the direction of rotation of the seatback 18 and the amount the seatback 18 is rotated relative to the seat bottom 16 such as, for example, an optical sensor.

The armrest position sensor 40 and the seatback position sensor 70 may be in communication with an arm rest control module 72 and may provide the arm rest control module 72 with positional data of the arm rest 20 relative to the seatback 18 and the seatback 18 relative to the seat bottom 16, respectively. The arm rest control module 72 may be executed by a body control module (BCM) 74 of the vehicle 10, whereby the arm rest control module 72 is stored on memory hardware 76 of the BCM 74 and is executed by data processing hardware 78 of the BCM 74.

When the seatback 18 is rotated from the upright position shown in FIG. 3A to the reclined position shown in FIG. 4A, the seatback position sensor 70 determines the direction of the rotation and the degree or amount of rotation of the seatback 18 relative to the seat bottom 16. This information is transmitted to the arm rest control module 72 of the BCM 74 for use by the arm rest control module 72 in determining whether to retract or extend the screw 36 from the housing 38 to maintain the arm rest 20 in a position where the longitudinal axis LA of the arm rest 20 is substantially parallel to the floor pan 22 and/or the seat bottom 16 of the vehicle 10. The arm rest control module 72 is able to determine whether to retract or extend the screw 36 from the housing 38 based on information received form the arm rest control module 72 as well as from the arm rest position sensor 40, which identifies the current position of the arm rest 20 (i.e., by identifying the current position of the screw 36 relative to the housing 38).

Once the arm rest control module 72 receives information from the seatback position sensor 70 regarding the position of the seatback 18 relative to the seat bottom 16, the arm rest control module 72 can determine how to adjust a position of the screw 36 relative to the housing 38 to ensure that the arm rest 20 is maintained substantially parallel to the floor pan 22 and/or the seat bottom 16.

As shown in FIG. 3A, when the seatback 18 is in the upright position, the post 68 is in contact with the first stop 64, which prevents the arm rest 20 from rotating in the counterclockwise (CCW) direction relative to FIG. 3B. When the seatback 18 is moved from the position shown in FIG. 3A to the position shown in FIG. 4A, the arm rest control module 72 will energize the motor 34 to rotate the screw 36 in the clockwise (CW) direction to retract the screw 36 into the housing 38. In so doing, the second end 44 of the screw 36 exerts a force on the projection 50 of the lever 30 due to the rotatable connection of the second end 44 to the projection 50. The force exerted on the lever 30 causes the lever 30 to rotate in the CW direction relative to the view shown in FIGS. 3B and 4B about the spindle 54. Rotation of the lever 30 in the CW direction causes the first stop 64 to likewise move in the CW direction which, in turn, changes a position of the first stop 64 relative to the position of the first stop 64 shown in FIG. 3A. The degree of rotation of the lever 30 in the CW direction is dictated by the amount the screw 36 is retracted into the housing 38 and is based on the amount and direction of rotation of the seatback 18 relative to the seat bottom 16.

Figure 6:
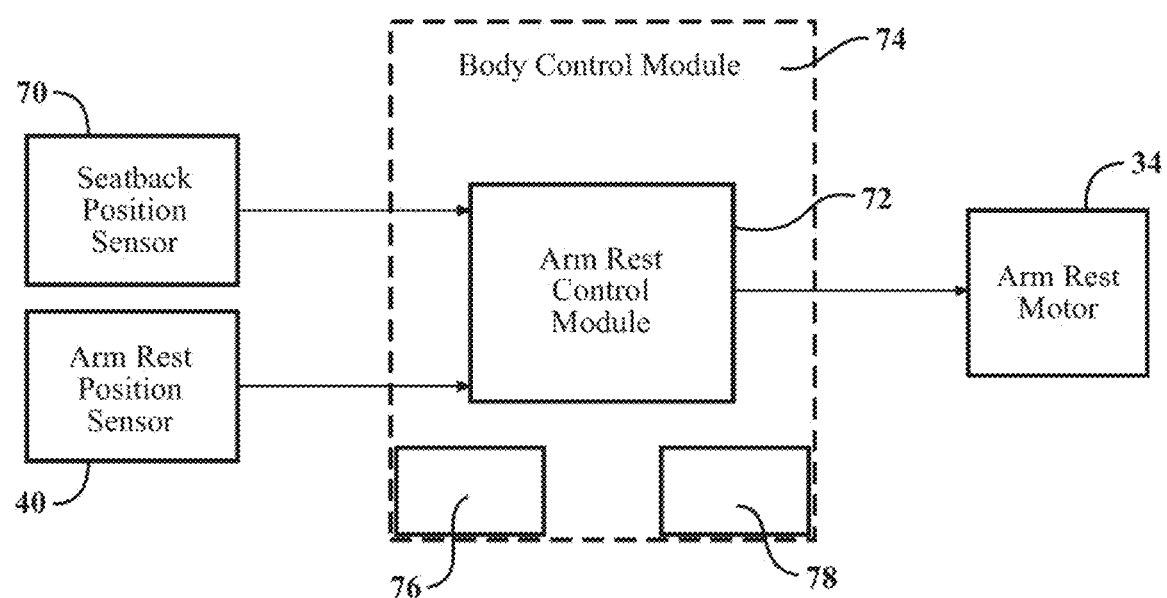
FIG. 6 is a schematic representation of a system for synchronizing movement of the arm rest of FIG. 3A with movement of a seatback of the vehicle seat of FIG. 2.

As shown in FIG. 6, the arm rest position sensor 40 and the seatback position sensor 70 are both in communication with the arm rest control module 72. Accordingly, the arm rest control module 72 is able to simultaneously receive data from both sensors 40, 70 to control and coordinate movement of the arm rest 20 in real time with movement of the seatback 18. For example, when the seatback position sensor 70 indicates that the seatback 18 is being moved relative to the seat bottom 16 (i.e., reclined, as shown in FIG. 4A), the arm rest control module 72 can energize the motor 34 to cause simultaneous movement of the screw 36 and lever 30. In so doing, the arm rest control module 72 can adjust a position of the first stop 64 in an effort to maintain the arm rest 20 in a position that is substantially parallel to the floor pan 22 and/or the seat bottom 16.

Figure 4B:
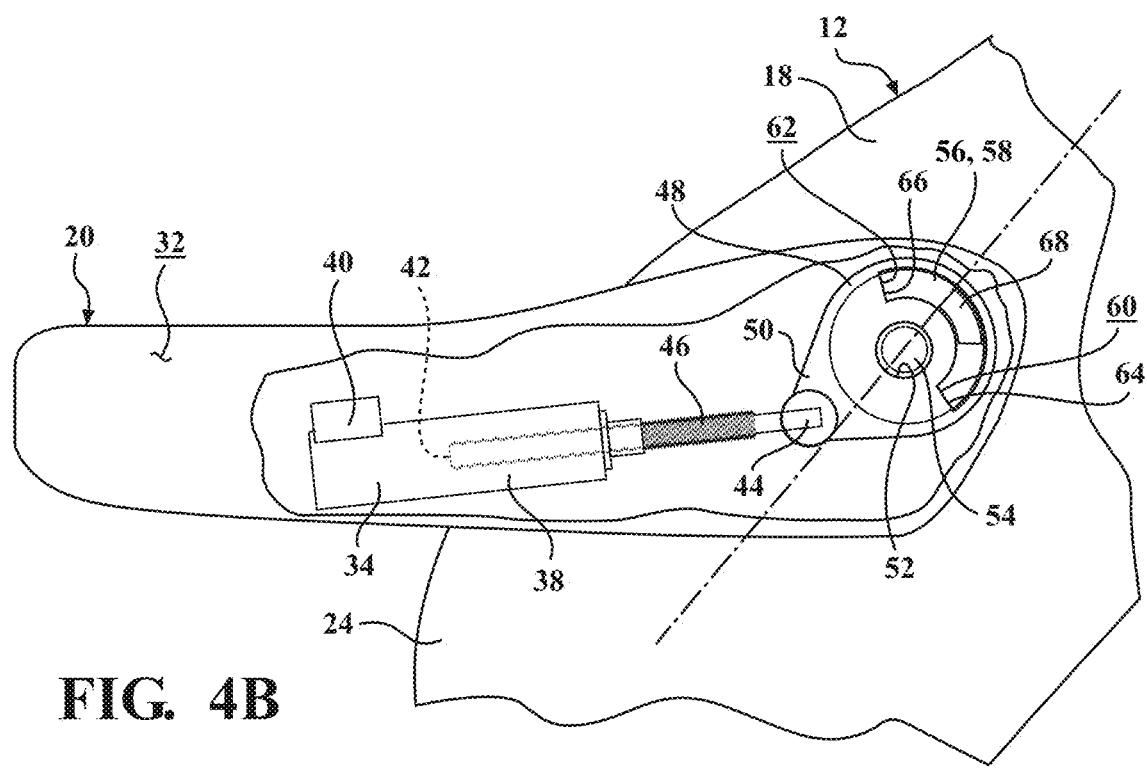
FIG. 4B is an enlarged view of the arm rest of FIG. 3A with part of a housing removed to show internal components of the arm rest when the vehicle seat is in the reclined position of FIG. 4A.

When the lever 30 and, thus, the first stop 64, are rotated in the CW direction relative to the view shown in FIGS. 3B and 4B, the arm rest 20 is rotated in the CCW direction relative to the seatback 18. Specifically, the weight of the arm rest 20 biases the arm rest 20 for rotation in the CCW direction relative to the views shown in FIGS. 3B and 4B. As such, when the first stop 64 is rotated in the CW direction, the arm rest 20 is permitted to rotate in the CCW direction due to the changing position of the first stop 64. In effect, as the shaft 68 of the seatback 18 is moved in the CW direction due to movement of the seatback 18 relative to the seat bottom 16 in the CW direction, the position of the lever 30 and the first stop 64 must also be moved to allow the arm rest 20 to be maintained in a parallel relationship with the floor pan 22 throughout movement of the seatback 18 relative to the seat bottom 16. It should be noted that while the weight of the arm rest 20 is described as biasing the arm rest 20 in the CCW rotational direction, a biasing member such as, for example, a spring (not shown) could additionally be implemented to further bias rotation of the arm rest 20 in the CCW direction.

Once the seatback position sensor 70 detects that the seatback 18 is no longer moving relative to the seat bottom 16, the arm rest control module 72 will stop rotation of the screw 36 by stopping the motor 34. In so doing, the arm rest control module 72 ensures that the exact rotation of the lever 30 in the CW direction is achieved to allow the arm rest 20 to remain substantially parallel to the floor pan 22 and/or the seat bottom 16 throughout movement of the seatback 18 relative to the seat bottom 16.

The foregoing example is provided for the case of the seatback 18 being rotated in the CW direction (i.e., reclined) relative to the seat bottom 16. When the seatback 18 is rotated in the CCW direction relative to the seat bottom 16, the arm rest control module 72 simply changes the direction of rotation of the screw 36 to cause the lever 30 to rotate in the CCW direction to maintain the arm rest 20 in a parallel relationship with the floor pan 22 and/or the seat bottom 16.

Figure 5B:
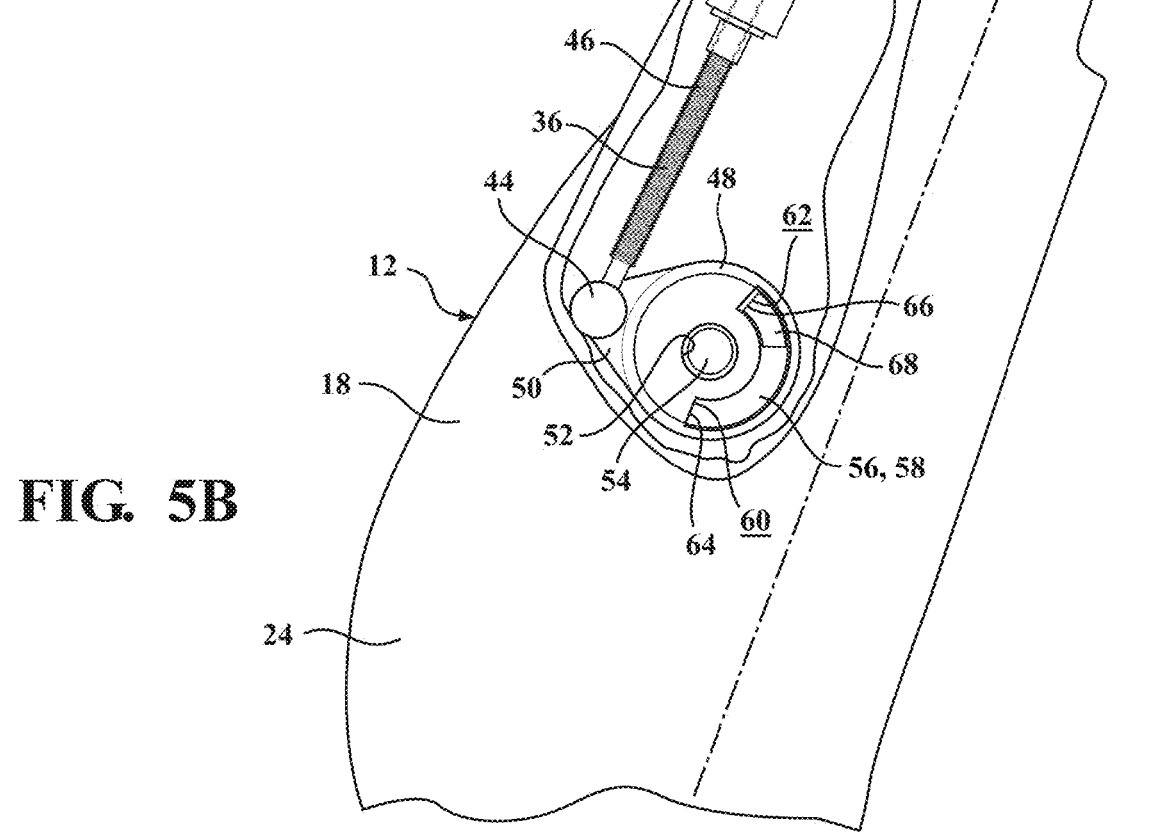
FIG. 5B is an enlarged view of the arm rest of FIG. 3A with part of a hosing removed to show internal components of the arm rest when the arm rest is in the stowed position.

With particular reference to FIGS. 5A and 5B, operation of the arm rest 20 moving from an extended position (FIGS. 3A and 4A) to a stowed position (FIG. 5A) will be described in detail. When an occupant wishes to stow the arm rest 20 to facilitate entry or exiting of the vehicle seat 10 or to fold the seatback 18 onto the seat bottom 16, the occupant may apply a force on the arm rest 20 in the CW direction relative to the view shown in FIGS. 5A and 5B. In so doing, the arm rest 20 is rotated in the CW direction relative to the seatback 18 and against the CCW rotational bias exerted on the arm rest 20 by the weight of the arm rest 20 itself.

Rotation of the arm rest 20 in the CW direction is permitted due to interaction of the shaft 68 and the recess 56. Specifically, rotation of the arm rest 20 in the CW direction causes the lever 30 to likewise rotate in the CW direction. In so doing, the first stop 64 effectively disengages and moves away from the shaft 68 of the seatback 18, which remains stationary. Movement of the arm rest 20 in the CW direction is permitted until the full range-of-motion of the arm rest 20 relative to the seatback 18 is achieved. Specifically, movement of the arm rest in the CW direction is permitted until the second stop 66 engages the shaft 68, thereby preventing further movement of the arm rest 20 in the CW direction. The arm rest 20 can be returned to the extended position by rotating the arm rest 20 in the CCW direction relative to the seatback 18 until the first stop 64 once again engages the shaft 68 of the seatback 18.

As described, the arm rest control module 72 coordinates movement of the arm rest 20 with movement of the seatback 18 relative to the seat bottom 16 to ensure that the arm rest 20 remains parallel to the floor pan 22 and/or the seat bottom 16 throughout movement of the seatback 18.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An arm rest for a seat having a seatback and a seat bottom, the arm rest comprising:
   a housing rotatable relative to the seatback;
   a motor disposed within the housing and configured to maintain a position of the housing relative to the seat bottom during movement of the seatback relative to the seat bottom; and
   a first sensor configured to detect a number of revolutions of the motor.

2. The arm rest of claim 1, wherein the first sensor is a Hall effect sensor.

3. The arm rest of claim 1, further comprising a screw extending from and driven by the motor, the screw configured to rotate a lever in contact with the seatback to adjust a position of the housing relative to the seatback.

4. The arm rest of claim 3, wherein the screw and the lever are disposed within the housing.

5. The arm rest of claim 3, wherein the lever defines a first stop and a second stop that cooperate to define a range-of-motion of the arm rest relative to the seatback.

6. A vehicle incorporating the arm rest and the seat of claim 1.

7. A seat comprising:
   a seat bottom;
   a seatback rotatably attached to the seat bottom;
   an arm rest rotatably attached to the seatback and including a housing; and
   an actuator disposed within the housing of the arm rest and including a motor and a screw, the actuator configured to move the arm rest relative to the seatback when the seatback is moved relative to the seat bottom to maintain a position of the arm rest relative to the seat bottom, the screw extending from and driven by the motor and configured to rotate a lever in contact with the seatback to adjust a position of the housing relative to the seatback.

8. The seat of claim 7, further comprising a seatback position sensor configured to detect a position of the seatback relative to the seat bottom and an arm rest position sensor configured to detect a position of the arm rest relative to the seatback.

9. The seat of claim 8, wherein at least one of the seatback position sensor and the arm rest position sensor includes a Hall effect sensor.

10. A vehicle incorporating the seat of claim 7.

11. A system for controlling a position of an arm rest relative to a seat having a seatback and a seat bottom, the system comprising:
    a first motor configured to adjust a position of the arm rest relative to the seatback;
    a second motor configured to adjust an angular position of the seatback relative to the seat bottom, the seatback movable between a number of angular positions relative to the seat bottom by the second motor;
    an arm rest control module configured to synchronize operation of the first motor with operation of the second motor to maintain a position of the arm rest relative to the seat bottom during and following movement of the seatback relative to the seat bottom between the number of angular positions;
    a first sensor configured to detect a position of the arm rest relative to the seatback and monitor the first motor; and
    a second sensor configured to detect a position of the seatback relative to the seat bottom and monitor the second motor.

12. The system of claim 11, wherein the first motor is disposed within a housing of the arm rest.

13. The system of claim 11, wherein at least one of the first sensor and the second sensor is a Hall effect sensor.

14. A vehicle incorporating the system of claim 11.

\* \* \* \* \*